(12) United States Patent
Chen

(10) Patent No.: US 6,637,026 B1
(45) Date of Patent: Oct. 21, 2003

(54) INSTRUCTION REDUCING PREDICATE COPY

(75) Inventor: William Y. Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/516,102

(22) Filed: Mar. 1, 2000

(51) Int. Cl.$^7$ ................................................. G06F 9/45
(52) U.S. Cl. ..................... 717/151; 717/144; 717/150; 717/155; 717/156; 717/159; 717/161; 709/103; 709/104; 712/226
(58) Field of Search ................................ 717/144, 150, 717/151, 155, 156, 159, 161; 709/104, 103, 106; 712/226

(56) References Cited

U.S. PATENT DOCUMENTS

| | | | | |
|---|---|---|---|---|
| 5,920,716 A | * | 7/1999 | Johnson et al. | 717/141 |
| 5,937,195 A | * | 8/1999 | Ju et al. | 712/201 |
| 6,009,512 A | * | 12/1999 | Christie | 712/218 |
| 6,157,996 A | * | 12/2000 | Christie et al. | 712/208 |
| 6,260,190 B1 | * | 7/2001 | Ju | 712/205 |
| 6,282,708 B1 | * | 8/2001 | Augusteijn et al. | 717/156 |
| 6,594,824 B1 | * | 7/2003 | Volkonsky et al. | 717/159 |

OTHER PUBLICATIONS

August, David I., Connors, Daniel A., Mahlke, Scott A., Sias, John W./, Crozier, Kevin M., Cheng, Ben–Chung, Eaton, Patrick Olaniran, Qudus B., Hwu, Wen–mei W., Integrated Predicated and Speculative Execution in the IMPACT EPIC Architecture, 1998, IEEE.*

August, David I., Hwu, Wne–mei, Mahlke, Scott A., "A Framework for Balancing Control Flow and Predication", 1997, IEEE, retrieved Jul. 2, 2002.*

Gillies, David M., Ju, Dz–ching Roy, Johnson, Richard, Schlansker, Michael, "Global Predicate Analysis and its Application to Register Allocation", 1996, ACM database, retrieved Jul. 11, 2002.*

Klaluser, Artur, Austin, Todd, Grunwald, Dirk, Calder, Brad, "Dynamic Hammock Predication for Non–Predicated Instruction Set Architectures", 1998, IEEE, retrieved Jul. 11, 2002.*

Gillies, D.M., et al., "Global Predicate Analysis and its Application to Register Allocation", *IEEE 1996,* 114–125, (1996).

Park, J.C., et al., "On Predicated Execution", *Software and Systems Laboratory, HPL–91–58* Copyright Hewlett–Packard Company 1991, 1–25, (1991).

* cited by examiner

*Primary Examiner*—Tuan Q. Dam
*Assistant Examiner*—Mary J Steelman
(74) *Attorney, Agent, or Firm*—Schwegman, Lundberg, Woessner & Kluth, P.A.

(57) ABSTRACT

When compiling software for a processor that supports predication, an alerting instruction can be inserted to alert a global register allocator to map particular virtual predicates into the same physical registers. Redundant predicate generating instructions are removed from the resulting program. The alerting instruction can be a predicate copy pseudo-opcode. When the register allocator maps the virtual predicates into the same physical register, the predicate copy pseudo-opcode is removed. When the register allocator does not map the virtual predicates to the same physical register, the predicate copy pseudo-opcode is replaced by an instruction that will perform a predicate copy.

36 Claims, 7 Drawing Sheets

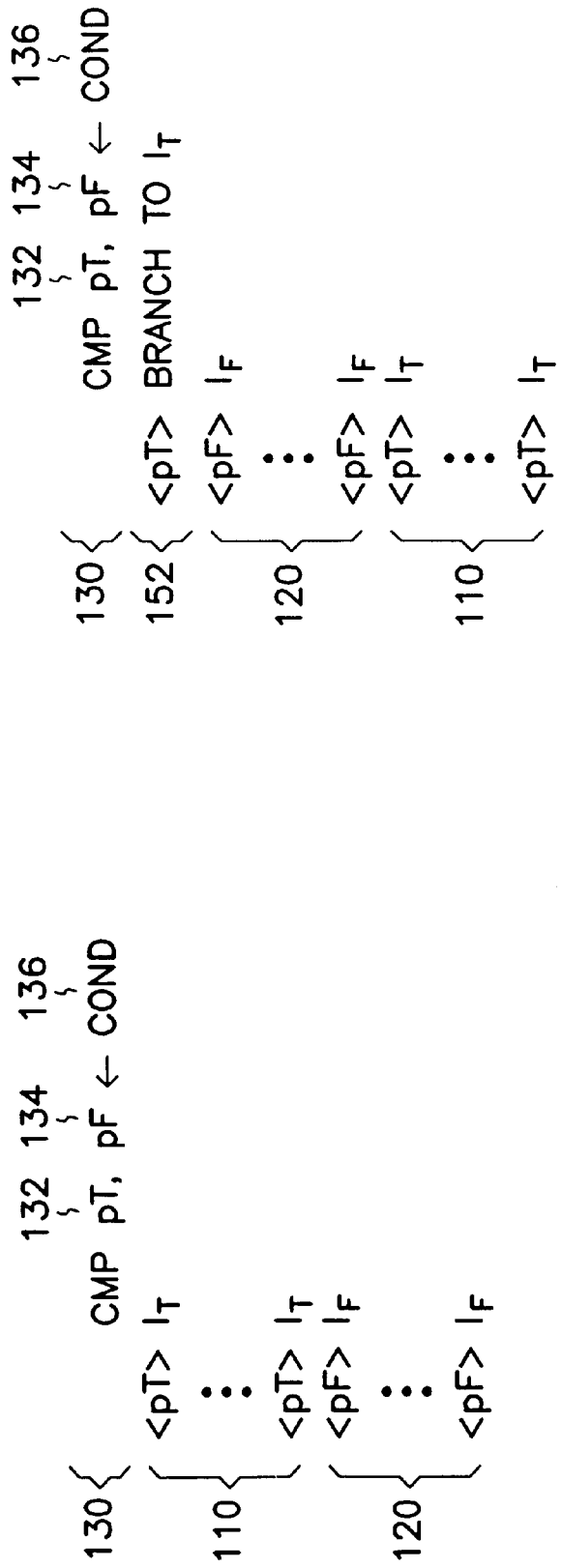

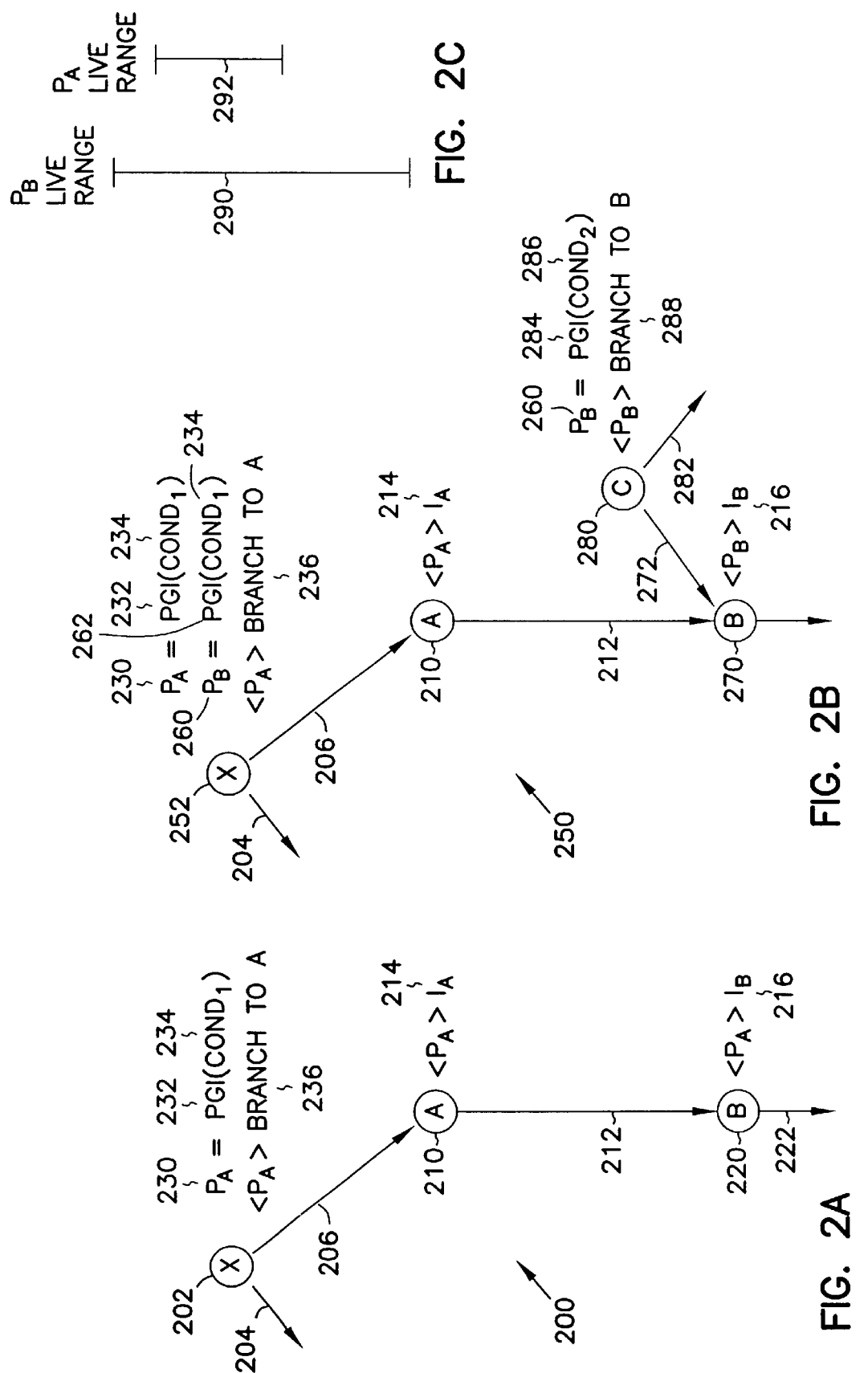

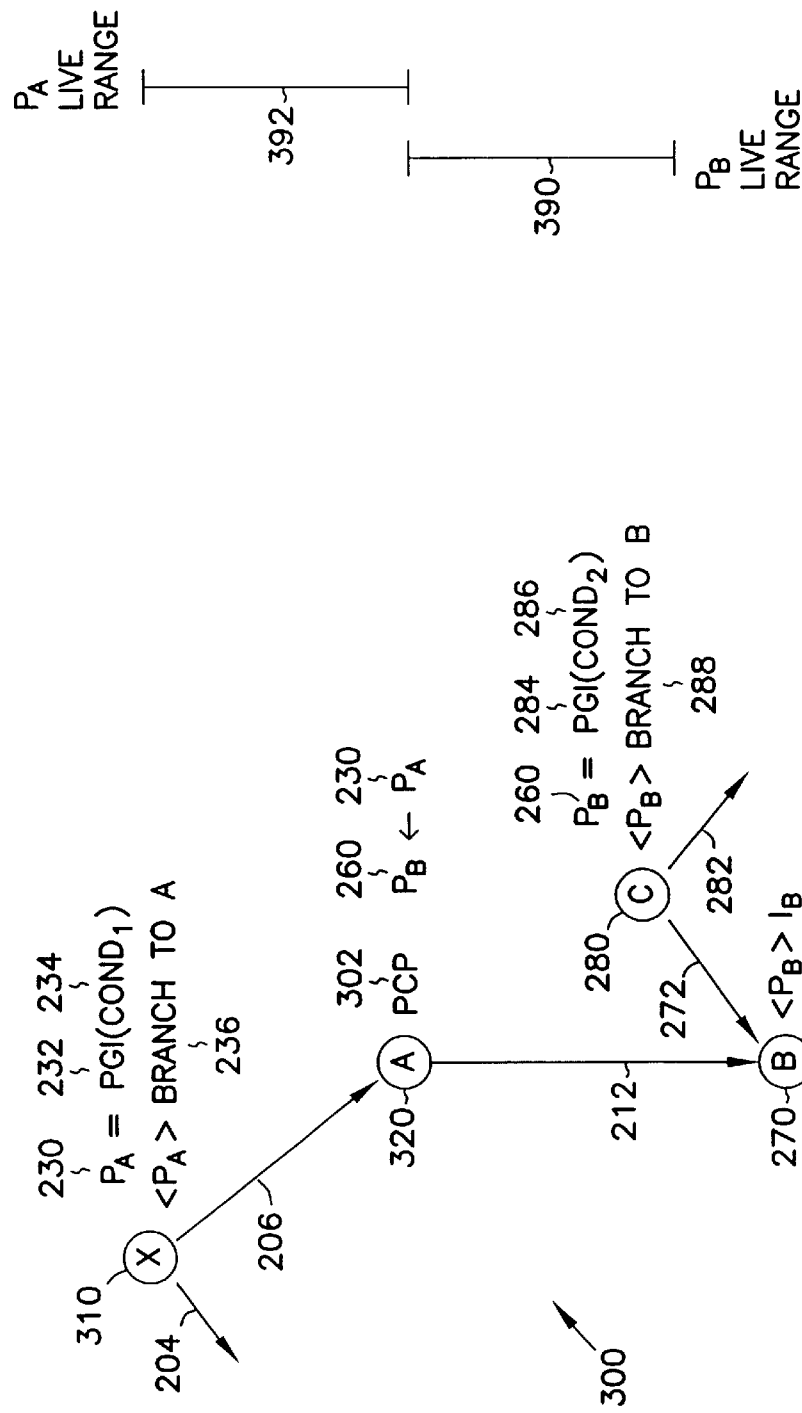

INSTRUCTION REDUCING PREDICATE COPY

FIELD

The present invention relates generally to the compilation of software, and more specifically to register allocation for processors that support predication.

BACKGROUND OF THE INVENTION

Modern processors that support predication guard the execution of instructions using predicates. A predicate is a value in a register, typically a single bit, that if set, allows instructions to be executed, and if clear, does not allow an instruction to execute. Predicates are set by predicate generating instructions that affect the instruction flow of the software program executing on the processor.

Predicate generating instructions are placed in the program in or before blocks that affect the control flow. For example, when a first block branches to a second block, and the second block is guarded by a predicate, the first block typically sets the predicate prior to the branch.

When multiple blocks follow a block that changes the control flow, multiple predicates are typically set prior to the branch, one predicate for each block in the future control flow. Oftentimes the multiple predicates are set based on the same condition, and the predicate generating instructions are redundant. Park and Schlansker present an algorithm to generate predicate generating instructions for predicated code. See J. C. H. Park & M. S. Schlansker, "On Predicated Execution," Tech. Rep. HPL-91-58, HP Laboratories, Palo Alto, Calif., May 1991.

During compilation, a virtual name for a predicate is associated with each block in a control flow graph (CFG). During register allocation, the virtual names for the predicates are mapped to the physical registers in the processor. The number of physical registers is typically much smaller than the number of virtual predicate names. Allocating registers to predicates can be a difficult problem. A discussion of mapping predicates to registers can be found in: David M. Gillies, Dz-ching Roy Ju, Richard Johnson & Michael Schlansker, "Global Predicate Analysis and its Application to Register Allocation," Proceedings of the 29th Annual International Symposium on Microarchitecture (MICRO), December 1996.

As described above, typical algorithms for compilation create redundant predicate generating instructions. Also, typical algorithms for register allocation map multiple virtual predicates corresponding to redundant predicate generating instructions to different physical registers, which are part of a finite resource. For the reasons stated above, and for other reasons stated below which will become apparent to those skilled in the art upon reading and understanding the present specification, there is a need in the art for an alternate method and apparatus for reducing the number of predicate generating instructions in software.

BRIEF DESCRIPTION OF THE DRAWINGS

FIGS. 1A and 1B show examples of software constructs that use predicate generating instructions;

FIG. 2A shows a subset of a control flow graph;

FIG. 2B shows path-equivalent nodes in a control flow graph;

FIG. 2C shows the live ranges of two predicates;

FIG. 3A shows a control flow graph without redundant predicate generating instructions;

FIG. 3B shows non-overlapping live ranges for two predicates;

DESCRIPTION OF EMBODIMENTS

Figure 4A:
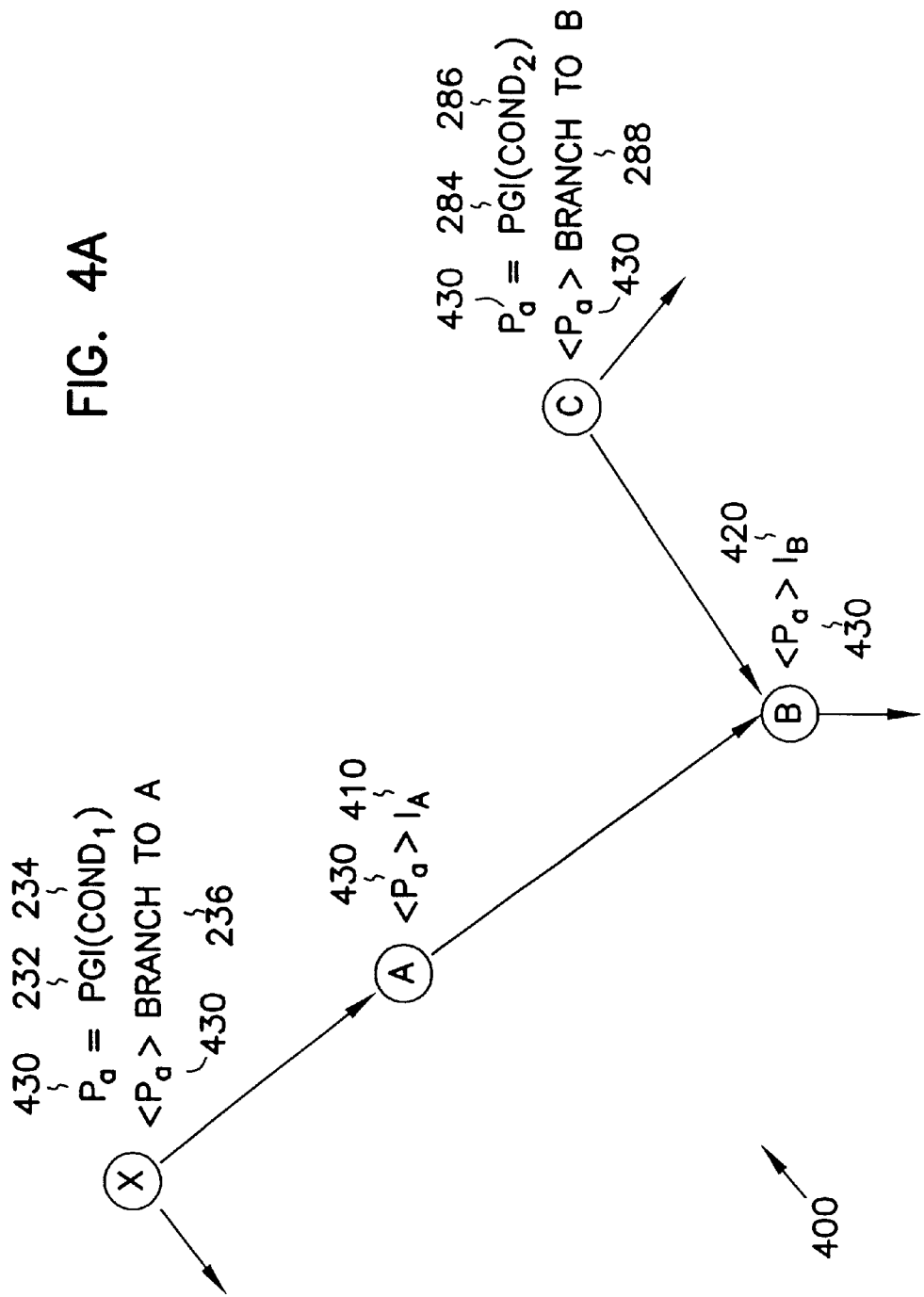
FIG. 4A shows one embodiment of a physical predicate register assignment.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for eliminating predicate generating instructions by finding path-equivalent blocks of instructions in the future flow of the program, and then merging their predicates. In some embodiments, this is performed in the virtual predicate name domain by identifying multiple predicate generating instructions having equivalent conditions used to generate predicates. One or more of the predicate generating instructions are removed, and an alerting instruction is placed in the code to alert a global register allocator. When mapping virtual names to physical registers, the global register allocator reads the alerting instruction and maps the multiple virtual predicate names to the same physical register. The result is a reduction in the number of predicate generating instructions.

FIG. 1A shows an example of a software construct that uses a predicate generating instruction. Instruction 130 is a compare instruction that, as a result of condition 136, asserts either true predicate 132 or false predicate 134. Predicate 132 is called the "true" predicate because it is set by compare instruction 130 when condition 136 is true, and predicate 134 is called the "false" predicate because it is set by compare instruction 130 when condition 136 is false. The names "true predicate" and "false predicate" are used to suggest the use to which the predicates are put, and are not meant to suggest the logical state of the predicate.

Compare instruction 130 is a predicate generating instruction because it changes the value of one or more predicates. Predicate generating instructions are a class of instructions, of which compare instruction 130 is an example. Other predicate generating instructions include bit test instructions and other instructions commonly used to change control flow in a program. Different predicate generating instructions can alter different numbers of predicates. In the example shown in FIG. 1A, predicate generating instruction 130 can alter two different predicates.

Predicates 132 and 134 are values held in predicate registers. Predicate generating instructions such as compare instruction 130 modify predicate registers that hold predicates such as true predicate 132 and false predicate 134. Processors that support predication can have any number of predicate registers. For example, in some embodiments, a processor has 64 predicate registers.

Predicates 132 and 134 are shown symbolically in FIG. 1A as pT and pF, respectively. This symbolic representation is sometimes referred to as "virtual naming." When software is compiled, virtual naming is used so as not to put undue constraints on the compiler. Virtual naming allows the compiler to generate an unlimited number of "virtual" predicates without being limited by finite processor resources. Before the software is executed, the symbolic predicates are mapped to actual predicate registers. Virtual naming and register assignment are discussed in further detail below with reference to the remaining figures.

Virtual naming and finite processor resources notwithstanding, the terms "predicate" and "predicate register" are sometimes used interchangeably in this description. When a predicate is modified, a value in the corresponding predicate register is modified. In some embodiments, predicate registers are a single bit wide. In these embodiments, the predicate registers take on a value of "1," or "0." When a predicate is set, the corresponding register includes the value "1." When a predicate is cleared, the corresponding register includes the value "0."

Instructions 110 are said to be "predicated upon" or "guarded by" true predicate 132. When instructions are guarded by a predicate, the instructions are executed and committed when the predicate is set, and the instructions may be executed but are not committed when the predicate is clear. For example, instructions 110 are predicated on true predicate 132, and instructions 120 are predicated on false predicate 134. When true predicate 132 is set, instructions 110 are executed and committed. When true predicate 132 is clear, instructions 110 may be executed, but they are not committed. Likewise, when false predicate 134 is set, instructions 120 are executed and committed. When false predicate 134 is clear, instructions 120 may be executed, but they are not committed.

When instructions are guarded by a predicate, such as instructions 110 that are guarded by predicate 132, the predicate register that includes the predicate is sampled during the execution of the instruction. The instruction is committed if the value of the predicate register is "1," and is not committed if the value of the predicate register is "0." The microarchitectural state of the processor may be modified as a result of executing the instruction guarded by a cleared predicate, but the architectural state is not modified because the guarded instruction is not committed.

The example shown in FIG. 1A is termed an "IF conversion." In higher level software code, an "IF-THEN-ELSE" construct that conditionally executes a portion of code based on the outcome of a condition can be compiled into a construct such as the one shown in FIG. 1A. When the condition in the "IF" statement is condition 136, the "THEN" portion of the construct includes instructions 110, and the "ELSE" portion of the construct includes instructions 120. "IF conversion" can be beneficial under many different circumstances. One such circumstance is when the number of instructions 110 is very small. When true predicate 132 is clear, instructions 110 will be fetched and executed, but not committed. Processor resources are utilized in the fetching and executing of instructions 110, but when the number of instructions 110 is small, the overhead incurred can be much less than the overhead caused by a branch instruction and the associated pipeline flushing.

FIG. 1B shows another example of a software construct that uses a predicate generating instruction. Predicate generating instruction 130 is the same compare instruction as that shown in FIG. 1A. Likewise, instructions 110 and 120 also represent the same instructions shown in FIG. 1A. Instruction 152 is a branch instruction guarded by true predicate 132. When, as a result of compare instruction 130, true predicate 132 is set, branch instruction 152 is executed and committed, thereby causing control flow to branch to instructions 110. If, however, as a result of compare instruction 130, true predicate 132 is cleared, branch instruction 152 is not committed and control flow continues with instructions 120. Instructions 120 are executed and committed when the false predicate register is set.

When a guarded branch instruction such as branch instruction 152 results in a taken branch, the control flow branches over instructions rather than simply failing to commit them, as was the case in the example of FIG. 1A. Utilizing a branch instruction may be more efficient than an "IF conversion" under varying circumstances, one of which being when the number of instructions 120 is very large. Although branch instruction 152 may cause one or more pipelines to be flushed, the performance penalty paid may be much less than the performance penalty associated with fetching and executing, but not committing, instructions 120.

FIG. 2A shows a subset of a control flow graph. Control flow graph 200 includes blocks 202, 210, and 220. Block 202 is labeled block X, block 210 is labeled block A, and block 220 is labeled block B. Each of blocks 202, 210, and 220 represent blocks of code in a software program. Control flow in the software program is shown by edges between blocks. Edge 206 transitions from block X to block A and edge 212 transitions from block A to block B. Edge 222 transitions from block B to blocks occurring later in the flow (not shown), and edge 204 shows a transition from block X to other blocks on a separate path (also not shown).

Multiple edges exit from block X. For example, edge 206 is one edge exiting block X, and edge 204 is another edge exiting block X. Control flow from block X takes either edge 204 or edge 206, but not both. Predicate generating instruction 232 determines whether edge 206 is taken in control flow graph 200. Predicate generating instruction 232 is included within block X, and can be any type of predicate generating instruction, such as compare instruction 130 (FIG. 1A).

Predicate generating instruction 232 checks condition 234 and alters predicate 230 as a result. When predicate 230 is set, edge 206 is taken and block A is executed. When predicate 230 is clear, edge 206 is not taken and block A is not executed. In some embodiments, edge 206 is taken as a result of guarded branch instruction 236 following predicate generating instruction 232. In other embodiments, edge 206 can be taken without a branch instruction. This can occur when edge 206 is organized as an "IF conversion," like that shown in FIG. 1A.

Edge 212 is the only edge exiting block A, so in CFG 200, block B is always executed when block A is executed. This is termed "post-domination." Block B is said to post-dominate block A. Likewise, if block B is executed then block A was necessarily previously executed. This is termed "pre-domination." Block A is said to pre-dominate block B. Blocks A and B are termed "equivalent" because whenever one is executed, the other is executed. Because blocks A and B are equivalent, they can both be guarded by the same predicate. As shown in FIG. 2A, instructions 214 in block A and instructions 216 in block B are both guarded by predicate 230. Since only one predicate is used to guard both blocks A and B, only one predicate generating instruction is included within block X.

FIG. 2B shows path-equivalent nodes in a control flow graph. Portions of CFG 250 are the same as CFG 200 (FIG. 2A). Block 210, labeled as block A, is the same in CFG 250 as it is in CFG 200. A single edge 206 enters block A and a single edge 212 exits block A, and instructions 214 in block A are still guarded by predicate 230.

CFG 250 differs from CFG 200 in a number of ways. A first difference is that block X, shown as block 252 in CFG 250, includes two predicate generating instructions. Predicate 230 is set as a result of predicate generating instruction 232, and block A is guarded by the result. Predicate generating instruction 262 alters the state of predicate 260 as a result of the same condition checked by predicate generating instruction 232. Predicate 260 guards execution of instructions 216 in block B, shown as block 270 in CFG 250.

A second difference is that two edges enter block B, edges 212 and 272. Edge 272 transitions from block 280, shown as block C in FIG. 2B, to block B. Block C includes predicate generating instruction 284 that alters predicate 260. Predicate 260 then guards execution of block B.

Blocks A and B in CFG 250 are not equivalent like they are in CFG 200. Block B still post-dominates block A because whenever block A executes, block B still necessarily executes. However, block A no longer pre-dominates block B because block B can be executed without block A being first executed. This can occur when block B is entered on edge 272. Although blocks A and B are not equivalent in control flow graph 250, the behavior of the control flow on the path from block X through block A to block B is the same in both CFGs 200 and 250. Blocks A and B are equivalent on the path from A to B, even though when CFG 250 is taken as whole, they are not equivalent. This is termed "path-equivalence." Blocks A and B are said to be path-equivalent even though they are otherwise non-equivalent.

When CFG 250 is traversed from Block X through block A to block B, predicate generating instructions 232 and 262 are redundant. They are redundant because they check the same condition, condition 234, and they set predicates that guard path-equivalent blocks. Some embodiments of the present invention exploit the path-equivalence of blocks such as blocks A and B to remove redundant predicate generating instructions.

On the path from block X to block B, predicates 230 and 260 have the same value: they are both set at the same time. On the path from block C to block B, predicates 230 and 260 are "disjoint," meaning that predicates 230 and 260 cannot be set at the same time. Although it would be correct to use predicate 260 to guard branch instruction 236 in the example shown in FIG. 2B, a later compilation phase performing predication analysis may compute the wrong relationship and misconstrue that predicate 260 is mapped to block A, when in fact, predicate 230 is mapped to block A. An incorrect code sequence can be generated if an instruction in block A is guarded by predicate 260 and moved downward into block B. The moved instruction would be improperly executed when block B was executed along the path from block C to block B.

Predicates 230 and 260 are shown in FIGS. 2A and 2B with virtual names rather than register names. The predicates are shown subscripted with the letter of the block that they guard. For example, predicate 230 is subscripted with "A" because it guards block A, and predicate 260 is subscripted with "B" because it guards block B. Separate virtual predicate names are maintained during compilation for path-equivalent blocks for the reasons explained in the previous paragraph. This does not mean, however, that the separate virtual predicate names have to be allocated to separate physical predicate registers, and that both predicate generating instructions 232 and 262 are necessary. When virtual names are mapped to physical predicate registers, if predicates 230 and 260 are mapped to the same physical register, then one of predicate generating instructions 232 and 262 can be removed.

FIG. 2C shows the live ranges of two predicates. Live range 290 shows the live range of predicate 260, and live range 292 shows the live range of predicate 230. As can be seen in FIG. 2B, the two live ranges overlap. A register allocator that follows a compiler will not ordinarily map two predicates with overlapping live ranges to the same physical register. In some embodiments of the present invention, the live ranges of the two predicates are modified so that there is no overlap, thereby allowing both predicates to be mapped to the same physical register. This is described more fully with reference to the remaining figures.

FIG. 3A shows a control flow graph without redundant predicate generating instructions. CFG 300 includes blocks 310, 320, and 270. Block 310, labeled block X in CFG 300, is different from block X in CFG 250 (FIG. 2B). Predicate generating instruction 262 has been removed, and only predicate generating instruction 232 remains. As previously described, predicate generating instructions 232 and 262 were redundant because they set predicates that guard path-equivalent blocks, and the conditions used to set the predicates were identical.

Block 320, labeled block A in CFG 300, is different from block A in CFG 250 (FIG. 2B). Predicate copy instruction 302, shown as PCP 302, has been inserted in block A. Predicate copy instruction 302 is an "alerting instruction" that alerts the global register allocator that follows the compiler to attempt to assign predicates 230 and 260 to the same physical predicate register. In some embodiments, predicate copy instruction 302 is an actual opcode that will copy the value of predicate 230 to predicate 260. In these embodiments, the global register allocator can determine independently whether to assign predicates 230 and 260 to the same physical register.

In other embodiments, predicate copy instruction 302 is a pseudo-opcode that has no directly equivalent opcode in the instruction set of the processor. In these embodiments, the global register allocator can read predicate copy instruction 302 as a "hint" to attempt to assign both predicates 232 and 262 to the same physical register. When the assignment can be made, then the hint is taken and the assignment is made. When the assignment cannot be made, predicate copy instruction 302 is removed and an actual opcode that can perform the predicate copy is inserted in its place. For example, a compare instruction that compares predicate 230 with a "1" can set predicate 260 if the condition is true. This sets predicate 260 to the same value as predicate 230.

In other embodiments, predicate copy instruction 302 is an alerting instruction that acts as a directive to the global register allocator to assign both predicates 230 and 260 to the same physical register. In these embodiments, the global register allocator reads the alerting instruction and assigns the two predicates to a single physical register.

The following pseudo-code shows a general algorithm for removing redundant predicate generating instructions and inserting predicate copy instructions.

```
1   Foreach virtual predicate name "n" assigned to a block
2     If "n" is defined in multiple paths
3       and a predicate copy insertion block is available for all
4       paths for n and profitable(n)
5         Foreach definition path p of n in descending cost
6           If profitable on definition path p of n
7             Insert predicate copy in insertion block
              on p
8             Remove predicate generating instruction
9           End If
10        End Foreach
11      End If
12  End Foreach
```

In the example pseudo-code above, "n" corresponds to predicate 260 assigned to block B in CFG 250 (FIG. 2B). At line 2, the "if" statement checks to see if "n" is defined in multiple paths. It is defined in multiple paths if, as in CFG 250, the predicate is defined on more than one path into the block having a predicate of "n." In CFG 250, "n" is defined on the path from block X to block B because predicate 260 is set by predicate generating instruction 262, and "n" is defined on the path from block C to block B because predicate 260 is set by predicate generating instruction 284.

The "if" statement on line 2 in the pseudo-code example also checks whether a predicate copy insertion block is available. A predicate copy insertion block is a path-equivalent block occurring earlier in the control flow. Block A satisfies this criterion. The "if" statement on line 2 also checks to see if the operation is profitable. The profitable ( ) function can be any cost function that determines the efficacy of the proposed operation.

The "foreach" loop starting at line 5 inserts predicate copy instructions and removes predicate generating instructions when profitable. In the example of CFG 300 (FIG. 3A), a predicate generating instruction was removed and a predicate copy instruction was inserted on the path from block X to block B, and neither operation was performed on the path from block C to block B.

FIG. 3B shows non-overlapping live ranges for two predicates. Live range 392 shows the live range of predicate 230 in CFG 300, and live range 390 shows the live range of predicate 260 in CFG 300. As a result of the changes made in the CFG, live ranges 390 and 392 do not overlap. For example, the beginning of live range 392 for predicate 230 occurs when predicate 230 is first referenced in the program in block X. Predicate 230 is live during the execution of block A because block A is guarded by predicate 230. The end of live range 392 occurs when predicate 230 is last referenced in predicate copy instruction 302.

The beginning of live range 390 occurs when predicate 260 is first referenced, which in CFG 300 is at predicate copy instruction 302. Live range 390 ends when predicate 260 is last referenced, which in this example is after block B. By removing the redundant predicate generating instruction 260 (FIG. 2B) from the control flow graph, the beginning of the live range of predicate 260 has been pushed down in the control flow. By adding predicate copy instruction 302, the end of live range 392 has been made to coincide with the beginning of live range 390. In this example embodiment, when the global register allocator determines that the live ranges of predicates 230 and 260 do not overlap, the global register allocator can assign both predicates to the same physical predicate register.

FIG. 4A shows one embodiment of a physical predicate register assignment. Predicate generating instruction 232 in block X modifies the predicate in predicate register 430, shown as "pa" in FIG. 4A. Branch instruction 236 is predicated on the value of predicate register 430. Predicate register 430, as utilized in block X, represents predicate 230 (FIG. 3A). Instructions 410 in block A are also guarded by the value of predicate register 430. Here, predicate register 430 still corresponds to predicate 230, because predicate 230 guarded instructions in block 320, which is block A in CFG 300 (FIG. 3A).

Predicate register 430 also guards instructions 420 in block B. Here, predicate register 430 represents predicate 260 (FIG. 3A). As shown in FIG. 4A, predicates 230 and 260 (FIG. 3A) have both been assigned to physical predicate register 430. As a result, redundant predicate generating instruction 262 (FIG. 2B) has been removed from the software represented by CFG 400. A global register allocator read an alerting instruction, such as predicate copy instruction 302 (FIG. 3A), determined that the live ranges of predicates 230 and 260 did not overlap, and made the assignment as shown in FIG. 4A.

Figure 4B:
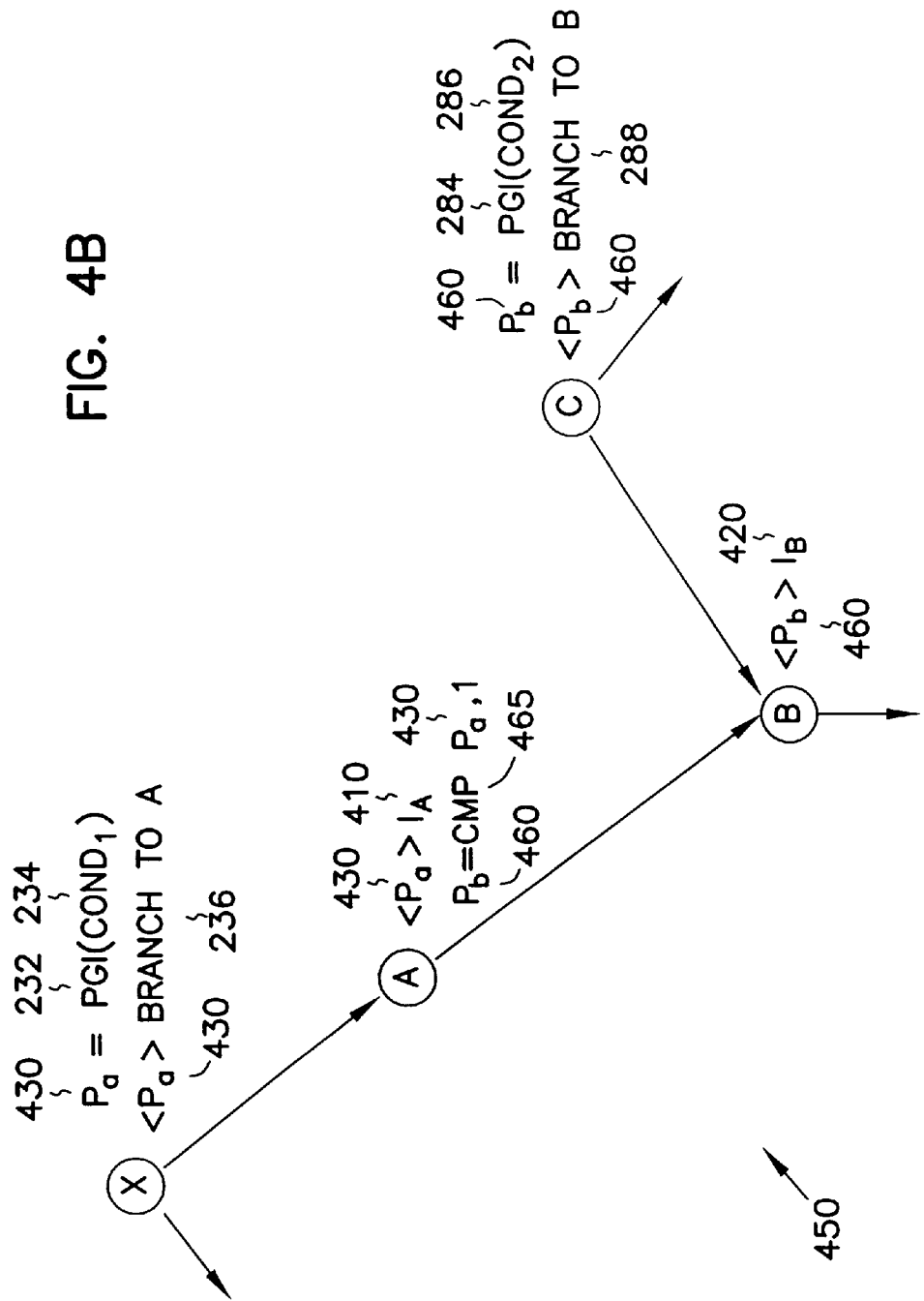
FIG. 4B shows another embodiment of a physical predicate register assignment.

FIG. 4B shows another embodiment of a physical register assignment. In CFG 450, predicates 230 and 260 (FIG. 3A) are assigned to different physical predicate registers, but redundant predicate generating instruction 262 (FIG. 2B) has still been removed. The actions in block X are the same as in CFG 400 (FIG. 4A). In block A, instructions 410 are guarded by the value of predicate register 430, which is also the same as CFG 400. Compare instruction 465 has been inserted in block A. Compare instruction 465 copies the value of predicate register 430 to predicate register 460. As a result, predicate register 460 has been assigned predicate 260 (FIG. 3A). Instructions 420 in block B are guarded by the value of predicate register 460. In block C of CFG 450, predicate register 460 is utilized where predicate 260 appeared in control flow graph 300 (FIG. 3A).

In control flow graph 450, a redundant predicate generating instruction has been removed, but a compare instruction 465 has been added. In the embodiment of FIG. 4B, if compare instruction 465 utilizes less processor resources than redundant predicate generating instruction 262, then a net savings of processor resources results.

Figure 5:
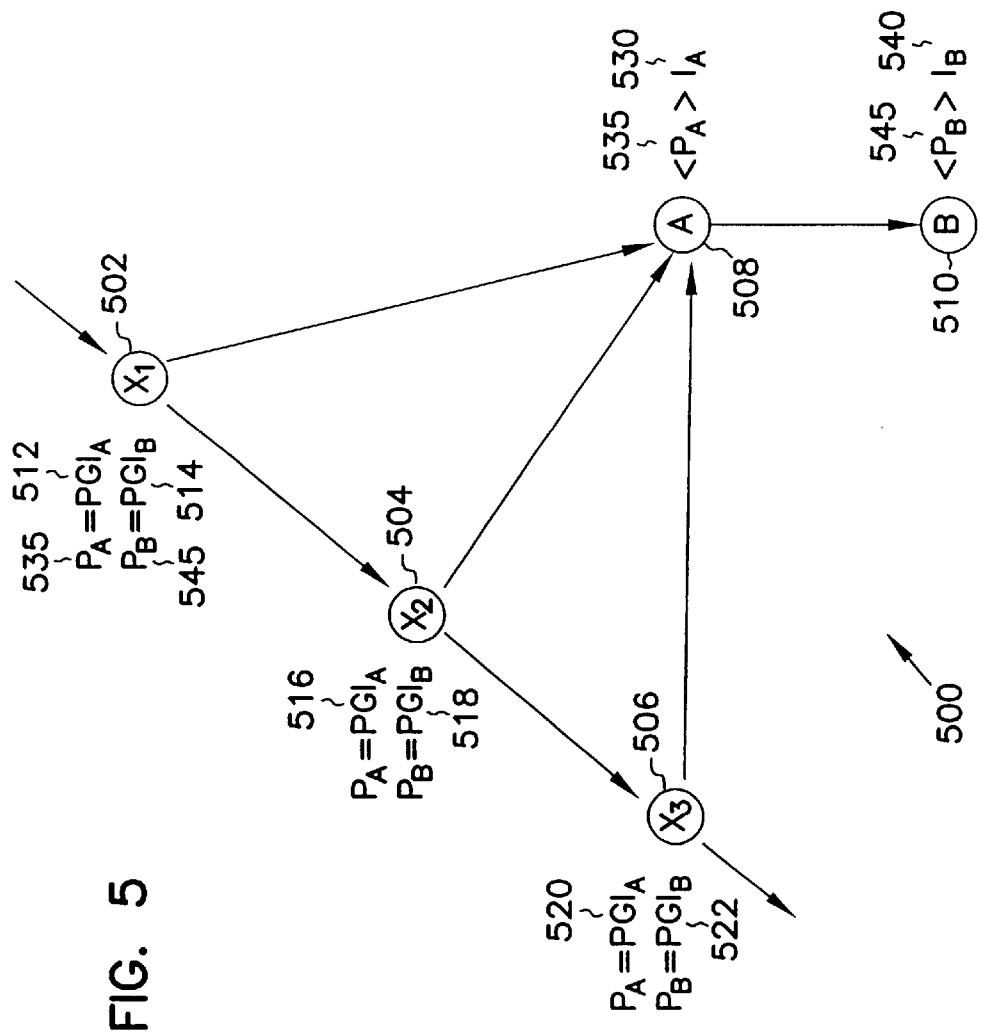
FIG. 5 shows a control flow graph with multiple redundant predicate generating instructions.

FIG. 5 shows a control flow graph with multiple redundant predicate generating instructions. CFG 500 includes blocks 502, 504, and 506, labeled X1, X2, and X3, respectively. CFG 500 also includes blocks 508 and 510, labeled A and B respectively. Blocks A and B in CFG 500 correspond to blocks A and B shown in previous figures. Instructions 530 within block A are guarded by predicate 535. Likewise, instructions 540 within block B are guarded by predicate 545. Blocks A and B are path-equivalent on any of the paths to block B from blocks X1, X2, or X3.

Each of blocks X1, X2, and X3 include two predicate generating instructions. For example, in block X1, predicate 535 is altered as a result of predicate generating instructions 512, and predicate 545 is altered as a result of predicate generating instructions 514.

Any of the previously described embodiments of the present invention can be applied to the software represented by control flow graph 500. For example, redundant predicate generating instructions can be removed from each of blocks X1, X2, and X3. This includes predicate generating instructions 514, 518, and 522. A predicate copy instruction can be included in block A. A predicate copy instruction inserted in block A can function as an alerting instruction to a global register allocator.

When predicate 535 and 545 are assigned to the same physical predicate register, a result similar to that shown in CFG 400 (FIG. 4A) is achieved. Each redundant predicate generating instruction is removed, and no other instructions are inserted. When predicates 535 and 545 are not assigned the same physical predicate register, the results are similar to those shown in CFG 450 (FIG. 4B). A single compare instruction is inserted into block A, and each redundant predicate generating instruction is removed as previously described. It can be seen, therefore, that even though a compare instruction or other predicate copy instruction remains in the resulting software code, a net savings results in part because multiple predicate generating instructions have been removed.

Figure 6:
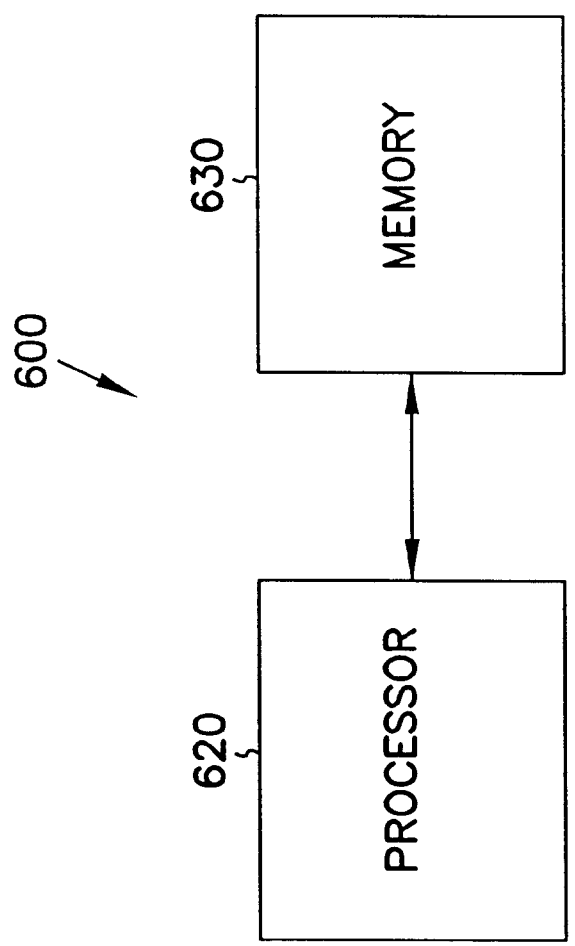
FIG. 6 shows a processing system.

FIG. 6 shows a processing system. Processing system 600 includes processor 620 and memory 630. In some embodiments, processor 620 is a processor capable of compiling software and removing redundant predicate generating instructions. Processor 620 can also be a processor capable of executing software that interprets alerting instructions and maps virtual predicates to physical predicate registers. Processing system 600 can be a personal computer (PC), mainframe, handheld device, portable computer, set-top box, or any other system that includes software.

Memory 630 represents an article that includes a machine readable medium. For example, memory 630 represents any one or more of the following: a hard disk, a floppy disk, random access memory (RAM), read only memory (ROM), flash memory, CDROM, or any other type of article that includes a medium readable by processor 620. Memory 630 can store instructions for performing the execution of the various method embodiments of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for reducing the number of predicate generating instructions in software comprising:
    locating two non-equivalent blocks that are path-equivalent;
    removing a predicate generating instruction from a block preceding the two non-equivalent blocks, the predicate generating instruction being configured to generate a predicate that guards execution of one of the two non-equivalent blocks.

2. The computer-implemented method of claim 1 further comprising:
    alerting a register allocator to assign a single physical predicate register to guard execution of both non-equivalent blocks.

3. The computer-implemented method of claim 2 wherein alerting a register allocator comprises inserting a pseudo-opcode at a definition point for a predicate that guards execution of a later occurring of the two non-equivalent blocks.

4. The computer-implemented method of claim 2 wherein alerting a register allocator comprises inserting a compare instruction at a definition point for a predicate that guards execution of a later occurring of the two non-equivalent blocks.

5. The computer-implemented method of claim 1 further comprising:
    assigning a single physical predicate register to guard execution of both non-equivalent blocks.

6. The computer-implemented method of claim 1 wherein removing a predicate generating instruction comprises removing a compare instruction from the block preceding the two non-equivalent blocks.

7. An article comprising a machine readable medium including instructions for a method of reducing the number of predicate generating instructions in machine code, the method comprising:
    locating two non-equivalent blocks that are path-equivalent;
    removing a predicate generating instruction from a block preceding the two non-equivalent blocks, the predicate generating instruction being configured to generate a predicate that guards execution of one of the two non-equivalent blocks.

8. The article of claim 7, the method further comprising:
    alerting a register allocator to assign a single physical predicate register to guard execution of both non-equivalent blocks.

9. A computer implemented method of mapping predicate names to predicate registers comprising:
    identifying a first live range of a first predicate name;
    identifying a second live range of a second predicate name; and
    when the first live range does not overlap with the second live range, and an alerting instruction exists between the first live range and the second live range, assigning the first predicate name and the second predicate name to a single predicate register.

10. The computer-implemented method of claim 9 wherein the second live range has a beginning and an end, and the alerting instruction marks the beginning of the second live range.

11. The computer implemented method of claim 9 further comprising removing the alerting instruction.

12. The computer-implemented method of claim 9 wherein the alerting instruction is a predicate copy pseudo-opcode.

13. A computer-implemented method of mapping predicate names to predicate registers comprising:
    identifying a first live range of a first predicate name;
    identifying a second live range of a second predicate name;
    when the first live range does not overlap with the second live range, and an alerting instruction exists between the first live range and the second live range, assigning the first predicate name to a first predicate register and the second predicate name to a second predicate register; and
    at the location of the alerting instruction, inserting a predicate generating instruction that assigns the value of the first predicate register to the second predicate register.

14. The computer-implemented method of claim 13 further comprising removing the alerting instruction.

15. The computer-implemented method of claim 13 wherein inserting a predicate generating instruction comprises inserting a compare instruction.

16. A computer-implemented method of removing predicate generating instructions from software compiled to run on a processor that supports predication, the method comprising:
    identifying a first block having a plurality of predicate generating instructions, including a first predicate generating instruction and a second predicate generating instruction, wherein the first predicate generating instruction is configured to alter a first predicate register and the second predicate generating instruction is configured to alter a second predicate register;

searching for two path-equivalent blocks each guarded by at least one of the first predicate register and the second predicate register; and removing at least one of the plurality of predicate generating instructions from the first block.

17. The computer-implemented method of claim 16 further comprising inserting a pseudo-opcode in between the two path-equivalent blocks.

18. The computer-implemented method of claim 17 wherein the pseudo-opcode is a predicate copy instruction.

19. The computer-implemented method of claim 16 further comprising inserting a compare instruction in between the two path-equivalent blocks.

20. The computer-implemented method of claim 16 further comprising modifying one of the two path-equivalent blocks such that both path-equivalent blocks are guarded by the same predicate register.

21. An article comprising a machine readable medium including instructions for a method of removing predicate generating instructions from software compiled to run on a processor that supports predication, the method comprising:

identifying a first block having a plurality of predicate generating instructions, including a first predicate generating instruction and a second predicate generating instruction, wherein the first predicate generating instruction is configured to alter a first predicate register and the second predicate generating instruction is configured to alter a second predicate register;

searching for two path-equivalent blocks each guarded by at least one of the first predicate register and the second predicate register; and removing at least one of the plurality of predicate generating instructions from the first block.

22. The article of claim 21, the method further comprising modifying one of the two path-equivalent blocks such that both path-equivalent blocks are guarded by the same predicate register.

23. A computer-implemented method of mapping virtual predicate names to physical predicate registers comprising:

identifying two non-equivalent blocks that are path-equivalent with respect to each other;

assigning different virtual names to the two non-equivalent blocks, the different virtual names having live ranges that do not overlap; and assigning the different virtual names to a single predicate register.

24. The computer-implemented method of claim 23 wherein identifying comprises:

identifying a first block; and identifying a non-equivalent second block that post-dominates the first block.

25. The computer-implemented method of claim 24 further comprising:

removing a predicate generating instruction from a block occurring prior to the two non-equivalent blocks.

26. The computer-implemented method of claim 23 wherein assigning the different virtual names to the same predicate register only occurs when an alerting instruction is present between the two non-equivalent blocks.

27. The computer-implemented method of claim 26 further comprising removing the alerting instruction.

28. The computer-implemented method of claim 26 wherein the alerting instruction is a pseudo-code predicate copy instruction.

29. An article comprising a machine readable medium including instructions for a method of mapping virtual predicate names to physical predicate registers, the method comprising:

identifying two non-equivalent blocks that are path-equivalent with respect to each other;

assigning different virtual names to the two non-equivalent blocks, the different virtual names having live ranges that do not overlap; and assigning the different virtual names to a single predicate register.

30. The article of claim 29, the method further comprising:

removing a predicate generating instruction from a block occurring prior to the two non-equivalent blocks.

31. A system comprising:

a random access memory to store at least a part of a number of instructions having a number of predicate generating instructions; and a processor to compile the number of instructions wherein one of the predicate generating instructions is removed from a block of the number of instructions that precedes two non-equivalent blocks of the number of instructions that are path-equivalent, the one of the predicate generating instructions to generate a predicate that guards execution of one of the two non-equivalent blocks.

32. The system of claim 31, wherein the processor to execute a global register allocator, the global register allocator to assign a single physical predicate register to guard execution of both non-equivalent blocks.

33. The system of claim 31, wherein the one of the predicate generating instructions comprises a compare instruction.

34. A machine readable medium that provides instructions, which when executed by a machine, cause the machine to perform operations comprising:

compiling a number of instructions that includes a number of predicate generating instructions, wherein compiling comprises locating two non-equivalent blocks that are path-equivalent and wherein compiling comprises removing a predicate generating instruction from a block preceding the two non-equivalent blocks, the predicate generating instruction to generate a predicate that guards execution of one of the two non-equivalent blocks; and performing global register allocation subsequent to the compiling of the number of instructions, wherein performing global register allocation comprises assigning a single physical predicate register to guard execution of the two non-equivalent blocks.

35. The machine readable medium of claim 34, wherein removing the predicate generating instruction comprises removing a compare instruction from the block preceding the two non-equivalent blocks.

36. The machine readable medium of claim 34, wherein compiling the number of instructions further comprises alerting a global register allocator to assign the single physical predicate register to guard execution of the one of the two non-equivalent blocks.

* * * * *

UNITED STATES PATENT AND TRADEMARK OFFICE
CERTIFICATE OF CORRECTION

PATENT NO.    : 6,637,026 B1
DATED         : October 21, 2003
INVENTOR(S)   : William Y. Chen It is certified that error appears in the above-identified patent and that said Letters Patent is hereby corrected as shown below:

Title page,
Item [56], References Cited, OTHER PUBLICATIONS, "August, Daivd I.," reference, insert -- " -- before "Integrated"; and insert -- " -- after "Architecture".

Column 11,
Line 66, delete "pseudo-code" and insert -- pseudo-opcode -- therefor.

Signed and Sealed this

Twenty-second Day of June, 2004

JON W. DUDAS
*Acting Director of the United States Patent and Trademark Office*